April 6, 1965 E. P. DUVAL 3,176,838

ELECTRICAL ELEMENT PACKAGES

Filed Dec. 27, 1962

Edward P. Duval
INVENTOR.

BY

William M. Anderson

ATTORNEY

United States Patent Office 3,176,838
Patented Apr. 6, 1965

3,176,838

ELECTRICAL ELEMENT PACKAGES

Edward P. Duval, Winthrop, Mass., assignor, by mesne assignments, to Duval Corporation, Canton, Mass., a corporation of Massachusetts Filed Dec. 27, 1962, Ser. No. 247,662
12 Claims. (Cl. 206—65)

The present invention is concerned with packages and more particularly with packages for packaging electrical elements such, for example, as diodes, transistors, resistors, capacitors, etc.

One object of the present invention is to provide packages for holding a plurality of electrical elements in which there are provided an individual receptive area for each element.

Another object of the present invention is to provide a package for electrical elements in which there are locking means for locking the elements in their individual receptive areas.

Still another object of the present invention is to provide packages for electrical elements which have means therein whereby said elements may be visually and electrically inspected without removing said elements from the package.

A further object is to provide packages for electrical elements which are scored at spaced intervals whereby said package may be split into smaller units.

A still further object is to provide a composite stack-pack for electrical elements.

Another object of the present invention is to provide packages such as described in the above objects which are cast from expanded plastic and further possess shock absorption properties.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
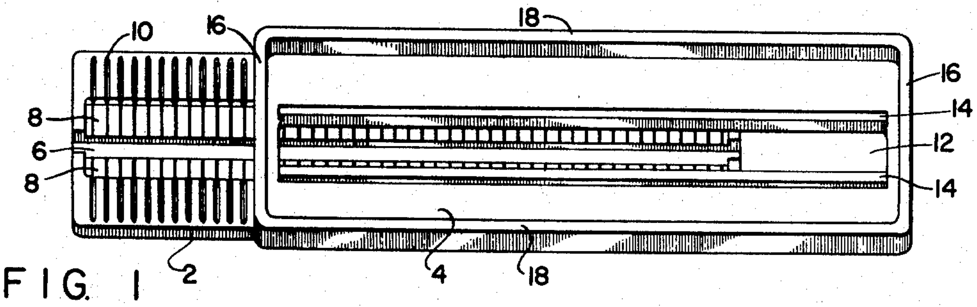
FIGURE 1 is a perspective view of the base and cover (bottom side) of one package within the scope of the present invention.

Referring now to FIGURE 1, there is shown a perspective view of the base 2 and cover 4 (bottom side) of a package within the scope of the present invention which is especially useful for packaging electrical elements comprising a housing 3 (FIG. 1A), e.g., a glass cylinder, and having axial wire leads 5 extending from each end of said housing, e.g., resistors, straight and lead diodes, etc. The base 2 generally consists of an elongated sheet of material, preferably of expanded plastic, and having therein a first longitudinal channel 6 for receiving the housings 3 of the electrical elements in side by side relationship and a plurality of transverse channels 10 on each side of the first longitudinal channel 6 for receiving the wire leads 5 of the electrical elements. The base 2 further includes a pair of secondary longitudinal channels 8, one on each side of the first longitudinal channel 10, which (secondary channels 8) run through the transverse channels 10. The cover 4 comprises a sheet of material for covering the base 2 and bears on its bottom side a pair of longitudinal ribs 14. The ribs 14 are positioned so that they will correspond and fit into the secondary longitudinal channels of the base 2 when the cover 4 is in position over the base 2. The ribs 14 cooperate with the secondary channels 8 to firmly lock the wire leads 5 in the transverse channels 10. In the embodiment shown in FIGURE 1 the cover 4 has a pair of end walls 16 and a pair of side walls 18 which telescopically fit over the base 2, and hold the cover 4 to the base 2. When the end walls 16 and side walls 18 are omitted, the ribs 14 and secondary channels 8 may also serve to lock the cover 4 in position. Between the ribs 14 of the cover 4 there is an elongated orifice 12 which is positioned to lie over the first longitudinal channel 6 when the cover 4 is in position over the base 2. This orifice permits the visual inspection of the electrical elements without removing the cover 4. In an especially useful embodiment of this invention the elongated orifice 12 is of sufficient width that portions of the wire leads 5 are also visible and accessible. Such a wide opening permits the leads from an electrical testing apparatus to be inserted so as to test the electrical elements without removing them from the package or removing the cover 4.

In a further embodiment of this invention the longitudinal ribs 14 and/or secondary channels 8 have positioned therein a length contact wire (not shown) which will contact the wire leads of each element in the package and place them in circuit. By connecting the ends of the contact wire to a source of power or a testing apparatus, the elements in certain instances may be electrically tested en masse.

Figures 1A, 2, 3:
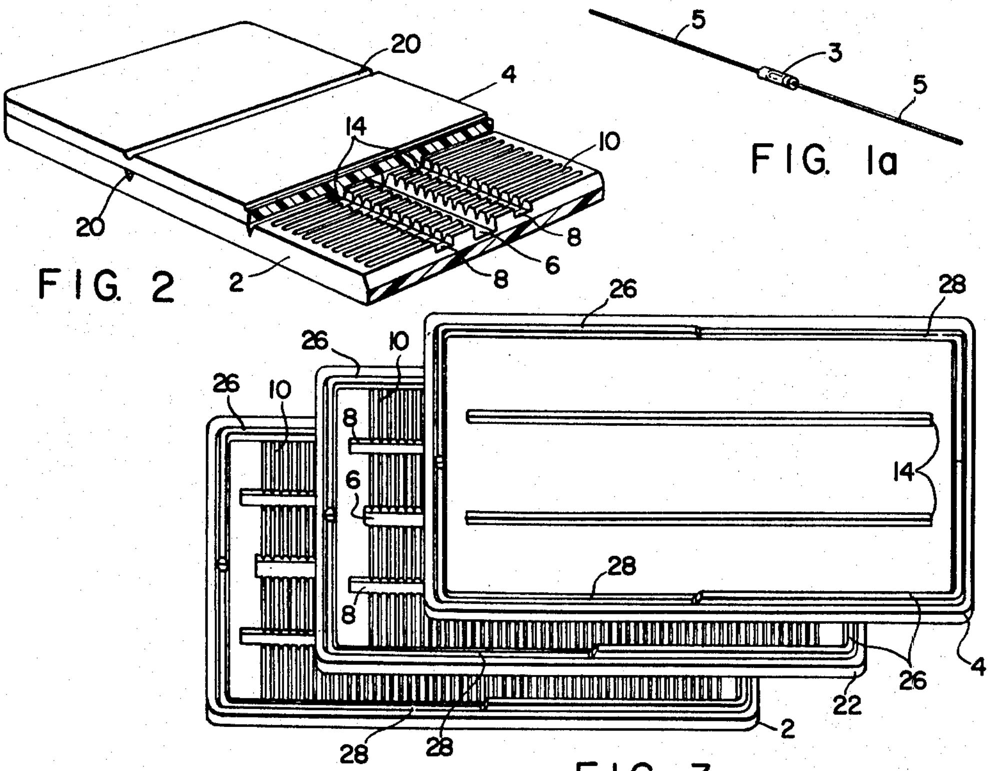
FIG. 1A is a perspective view of a diode which can be packed in the package of FIGURE 1.
FIG. 2 is a perspective view of a splitable package within the scope of the present invention.
FIG. 3 is a perspective view of the base, middle tray and cover (bottom side) of a stackable package within the scope of the present invention.

In an especially useful embodiment of the present invention the packages are scored at spaced intervals so that the package may be split into smaller units. An example of a package of this type is shown in FIG. 2. The package comprises a base 2 and a cover 4 which in this instance is devoid of the side walls and end walls as well as the elongated orifice of the package shown in FIGURE 1. The base 2, in a manner similar to the package of FIGURE 1, comprises an elongated sheet of material having therein a first longitudinal channel 6 for receiving the housings 3 of the electrical elements, secondary longitudinal channels 8 for receiving the ribs 14 of the cover 4 and a plurality of transverse channels 10 for receiving the wire leads 5 of the electrical elements. At predetermined and corresponding intervals along their lengths the base 2 and the cover 4 have transverse score lines 20 which facilitate the breaking of the package into smaller units. In a splitable package of this type, the locking means comprising the ribs 14 and the secondary longitudinal channels 8 is especially useful in that it locks the electrical element in place in the event uneven pressure is applied during the breaking step.

Still another embodiment of the present invention is a stack pack such as shown in FIG. 3. The package shown therein comprises a base 2, a cover 4 (bottom side shown) and at least one middle tray unit 22. The base 2 and middle tray units 22 have therein first longitudinal channels 6 for receiving the housings 5 of the electrical elements a plurality of transverse channels 10 for receiving the wire leads 5 of the electrical element and secondary longitudinal channels 8 for receiving the longitudinal ribs 14 from the bottom of the cover or from the bottoms (not shown) of the adjacent middle tray units 22. Although the bottom of the middle tray unit 22 is not shown it is similar in structure to the bottom of the cover 4. The top and bottom of the middle tray unit 22, as well as the top of the base 2 and the bottom of the cover 4 are provided around their edges with peripheral ribs 26 and peripheral rib-receptive channels 28 whereby the units of the package may be locked to one another. The peripheral ribs 26 and peripheral rib-receptive channels 28 are positioned and arranged in a complementary manner whereby when the package is assembled the peripheral ribs 26 of a first unit will correspond and extend into the peripheral rib-receptive channels 28 of the adjacent unit and the peripheral ribs 26 of the adjacent unit will correspond and extend into the peripheral rib-receptive channels 28 of the first unit.

Figure 4:
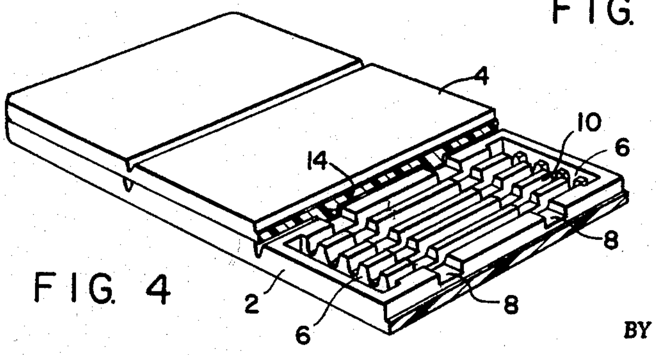
FIG. 4 is a perspective view of a package within the scope of the present invention which is especially useful for packaging transistors.

Referring now to FIG. 4, there is shown a further embodiment of the packages of the present invention which is especially useful for packaging electrical elements in which the wire leads are only attached to one end of the housing, e.g., transistors. The base 2 has therein a pair of first longitudinal channels 6 in spaced apart relationship. The first longitudinal channels 6 are joined by a plurality of transverse channels 10 which receive the wire leads of the electrical elements. The transverse channels 10 are cut by a pair of secondary longitudinal channels 8 which in turn receive the ribs 14 of the cover 4.

It should be understood that the stack-packs of the invention may include units for receiving electrical elements having the wire leads attached to a single end such as shown in FIG. 4 in addition to or in place of the units previously described.

The packages of the present invention are preferably cast from expanded or foamed plastics. Such materials provide the packages with added shock absorption properties. Thermoplastic pellets, comprising an expanding agent such as Pesas (trade name of Dow Chemical Co., Midland, Michigan, for polystyrene pellets having an expanding agent therein) have been found especially useful. Generally such materials are cast by heating the pellets in a restraining mold. The heat causes the pellets to expand and knit to one another; thus forming the casting.

When desired, the base 2 and covers 4 of the packages of the present invention may be further locked to one another by placing a sleeve over the units when they are assembled.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A package of electrical elements, which electrical elements comprise a housing having electrical components therein and axial wire leads extending from said housing, said package comprising a base and a cover for said base, said base comprising a first longitudinal channel having the housings of said electrical elements in side-by-side relationship therein, a plurality of transverse channels leading into said longitudinal channel having the wire leads of said electrical elements therein and at least one secondary longitudinal channel running through said transverse channels, said cover comprising a sheet of material to cover said base, the bottom of said cover bearing at least one longitudinal rib, said rib being positioned so as to correspond and fit into the secondary channel of said base when the cover is in place over said base, and thereby lock the electrical elements in place.

2. A package as defined in claim 1 wherein there are transverse channels on each side of said first longitudinal channel, a secondary longitudinal channel running through the transverse channels on each side of said first longitudinal channel and said cover bearing a longitudinal rib for each secondary channel.

3. A package as defined in claim 1 wherein said cover has a pair of end walls and a pair of side walls whereby said cover telescopically fits over said base.

4. A package as defined in claim 1 wherein said cover has therein a longitudinal orifice, said orifice being positioned so as to lie over said first longitudinal channel when said cover is in place, whereby the housings of said electrical elements may be visibly inspected without removing them from said package.

5. A package as defined in claim 4 wherein said longitudinal opening is of sufficient width that a portion of the wire leads are visible and accessible whereby said electrical elements may be electrically contacted and inspected without being removed from said package.

6. A package as defined in claim 2 wherein at least one member from each pair of corresponding secondary channels and longitudinal ribs bears an electrical contact wire, said contact wire contacting the wire leads from each electrical element whereby said elements may all be placed in a circuit and tested en masse.

7. A package as defined in claim 1 wherein said base and said cover at corresponding predetermined intervals are transversely striated whereby said package may be split into smaller units comprising a predetermined member of said electrical elements.

8. A package of electrical elements, which electrical elements comprise a housing having the electrical components therein and axial wire leads extending from each end of said housing, said package comprising a base and a cover, said base comprising a first longitudinal channel having the housing of said electrical elements in side-by-side relationship therein, a plurality of transverse channels on each side of said first longitudinal channel having the wire leads of said electrical elements therein, and secondary longitudinal channels running through said transverse channels on each side of said first longitudinal channel, said cover comprising a sheet of material to cover said base, the bottom of said cover bearing a longitudinal rib for each secondary channel, said ribs being positioned so as to correspond and fit into said secondary channels of said base when the cover is in place over said base.

9. A package as defined in claim 8 wherein said cover and said base at corresponding predetermined intervals are transversely striated whereby said package may be split into smaller units comprising a predetermined number of said electrical elements.

10. A package as defined in claim 8 wherein said cover includes a longitudinal orifice, said orifice being positioned over the first longitudinal channel when said cover is in place over said base whereby said electrical elements are visible without removing the cover.

11. A stack package of electrical elements, which electrical elements comprise a housing having electrical components therein and axial wire leads extending from said housing, said package comprising a cover, a base, and at least one middle tray, both said base and said middle trays having first longitudinal channels having the housings of said electrical elements, in side-by-side relationship therein, a plurality of transverse channels having the wire leads of said electrical elements therein and at least one secondary longitudinal channel running through said transverse channels, said cover comprising a sheet of material for covering the adjacent middle tray, the bottom of said cover and the bottom of each middle tray bearing at least one longitudinal rib, said rib being positioned so as to fit into the secondary channel of the adjacent member when said pack is assembled; the top of said base, the bottom of said cover and the top and bottom of said middle tray having peripheral ribs and peripheral rib receptive channels, said peripheral ribs and said peripheral rib receptive channels being positioned and arranged whereby when said package is assembled the peripheral ribs and peripheral rib receptive channels of one member will be complementary to the peripheral ribs and peripheral rib receptive channels of the adjacent member, thus locking said members to one another.

12. A package of transistors, said transistors comprising a housing and axial wire leads extending from one end of said housing, said package comprising a base and a cover for said base, said base comprising a pair of first longitudinal channels in spaced apart relationship having the housings of said transistor in side-by-side relationship therein, a plurality of transverse channels between said longitudinal channels having the wire leads from said housings therein, and a pair of secondary longitudinal channels running through said transverse channels at a point where the wire leads from said transistors extend, said cover comprising a sheet of material to cover said base, the bottom of said cover bearing a pair of longitudinal ribs, said ribs being positioned so as to correspond and fit into said secondary channels of said base when the cover is in place over said base.

References Cited by the Examiner

UNITED STATES PATENTS

| | | | |
|---|---|---|---|
| 2,228,493 | 1/41 | Will | 206—67 |
| 2,251,609 | 8/41 | Freeburg | 206—65 |
| 2,792,111 | 5/57 | Ringler et al. | 206—65 |
| 3,124,248 | 3/64 | Geoffrion et al. | 206—63 |

FRANKLIN T. GARRETT, *Primary Examiner.*

GEORGE O. RALSTON, *Examiner.*